US005548823A

United States Patent [19]
Hirasawa et al.

[11] Patent Number: 5,548,823
[45] Date of Patent: Aug. 20, 1996

[54] PORTABLE TELEPHONE HAVING A RECEIVER SECTION CAPABLE OF RECEIVING POWER FROM MULTIPLE EXTERNAL POWER SOURCES

[75] Inventors: Naoki Hirasawa, Tokyo; Shinichi Kobayashi, Saitama, both of Japan

[73] Assignee: NEC Corporation, Tokyo, Japan

[21] Appl. No.: 810,036

[22] Filed: Dec. 19, 1991

[30] Foreign Application Priority Data

Dec. 26, 1990 [JP] Japan ................. 2-406395

[51] Int. Cl.$^6$ .................................................. H04B 1/38
[52] U.S. Cl. .................. 455/89; 455/76; 455/343
[58] Field of Search ................. 455/76, 78, 83, 455/89, 127, 343, 95, 99, 100, 195.1, 196.1, 200.1, 264, 298, 317; 379/58; 331/185; 320/6, 15

[56] References Cited

U.S. PATENT DOCUMENTS

| | | | |
|---|---|---|---|
| 3,260,966 | 7/1966 | Murray | 455/127 |
| 4,027,242 | 5/1977 | Yamanaka | 455/76 |
| 4,598,258 | 7/1986 | Babano | 331/185 |
| 4,656,653 | 4/1987 | Oda et al. | 379/58 |
| 4,847,887 | 7/1989 | Suzuki et al. | 479/58 |
| 4,881,258 | 11/1989 | Kaiwa et al. | 379/58 |
| 4,939,770 | 7/1990 | Makino | 379/59 |
| 4,989,260 | 1/1991 | Meade | 455/127 |
| 5,036,532 | 7/1991 | Metroka et al. | 455/89 |
| 5,054,115 | 10/1991 | Sawa et al. | 455/89 |
| 5,136,229 | 8/1992 | Galvin | 455/89 |
| 5,149,985 | 9/1992 | Fujiwara | 455/345 |
| 5,170,494 | 12/1992 | Levanto | 379/58 |
| 5,203,020 | 4/1993 | Sato et al. | 455/127 |
| 5,367,556 | 11/1994 | Marui et al. | 455/89 |

Primary Examiner—Edward F. Urban
Attorney, Agent, or Firm—Sughrue, Mion, Zinn, Macpeak & Seas

[57] ABSTRACT

A portable telephone including a synthesized local oscillator using a voltage controlled oscillator in the receiver section and receiving its operation power from either built-in battery or an external power source. A first external voltage substantially equal to the output voltage of the built-in batteries and a second external voltage higher than the first voltage are used as the external power source voltage. The output voltage of the built-in battery and the second external voltage are supplied to the voltage controlled oscillator in response to the use of the built-in battery and the external power source, respectively.

11 Claims, 3 Drawing Sheets

PORTABLE TELEPHONE HAVING A RECEIVER SECTION CAPABLE OF RECEIVING POWER FROM MULTIPLE EXTERNAL POWER SOURCES

BACKGROUND OF THE INVENTION

The present invention relates generally to a portable telephone, more specifically to a portable telephone set to receive its operation power from either a built-in battery or an external power source.

Conventionally, this type of portable telephone comprises, as illustrated in FIG. 4, an antenna 1, a duplexer 2, a receiver section 10, a transmitter section 4, an external power input terminal 8, a power switch 5, a power selector 6 and a battery section 7. The operation power for the receiver section 10 is supplied either from the battery section 7 or the external power input terminal 8. In case of using the built-in batteries, the operation power for each element in the receiver section 10 is supplied from the battery section 7 by way of the power selector 6, a power switch 5 and a regulated power supply 22. On the other hand, in case of using an external power source, an external power source is connected to the external power input terminal 8. Such external power source is made available to each element in the receiver section 10 again through the power selector 6, the power switch 5 and the regulated power supply 22. It is typical that the voltage V1 of the external power supply is substantially equal to the reference voltage V0 of the built-in batteries included in the battery section 7.

In the conventional example as illustrated in FIG. 4, the operation power for all elements in the receiver section 10 is supplied to a single regulated power supply 22. However, there are instances where a plurality of regulated power supplies are included in the receiver section 10 or a regulated power supply is required to supply operation voltages to both of the receiver section 10 and the transmitter section 4. Also, there are certain instances where no regulated power supply is employed. However, it is common to all of the conventional portable telephone sets that the built-in batteries and the external power source supply operation power of essentially equal voltage to all elements in the receiver section 10.

As described hereinbefore, conventional portable telephone sets are capable of supplying their operation power from either the built-in batteries or the external power supply. However, the portable telephone is mostly operated on the built-in batteries rather than the external power source. It is also true that the portable telephone is frequently used in automobiles or in offices. As the frequency of using the portable telephone in automobiles and offices increases, it is obviously convenient to use the external power source such as car batteries or the AC power supply rather than the built-in batteries in order to avoid time consuming replacement or recharging of the built-in batteries. Especially, in case of using portable telephone in automobiles, it may be used with a booster powered by the external power source to amplify the transmitting output, thereby making it possible to use the portable telephone similar to the car-mounted telephone. An external power supply is generally used as the power source for the portable telephone in such instance.

A synthesized local oscillator is usually used in the portable telephone. Wireless channel switching can be made by simply switching the output frequency from the local oscillator. In the conventional example as illustrated in FIG. 4, the oscillation frequency of a voltage controlled oscillator 14 is switched by controlling at a synthesizer section 15, thereby effecting the wireless or radio channel switching by switching the frequency of first local oscillation power to be supplied to a first frequency mixing section 12. Adjacent channel selectivity is a typical performance of the receiver section of the portable telephone as the wireless communication equipment. Generally, the most influential factor to the channel selectivity is the S/N ratio in the first local oscillation power where S indicates the signal level of the signal to be noted and N indicates the noise level. The S/N ratio in the first local oscillation power is essentially determined by the S/N ratio in the output signal from the voltage controlled oscillator 14 in the conventional example as illustrated in FIG. 4. Other elements in the receiver section 10 will be described later.

In general, the S/N ratio in the voltage controlled oscillator has a strong correlation to the power supply voltage and the current consumption. For example, if designed with 5 volts or lower power supply voltage with 3 mA or lower current consumption, the S/N ratio is apparently inferior to the equipment designed with 10 volts or lower power supply voltage and 10 mA or lower current consumption. Accordingly, the performance of the receiver section using the voltage controlled oscillator of the latter design as the local oscillator is superior in channel selectivity.

Another performance of the portable telephone is a current consumption under the stand-by condition. Assuming that the stored maximum energy of the built-in batteries is constant, the smaller the stand-by current, the longer is the stand-by time of the portable telephone, which is advantageous to the user. Accordingly, reducing the stand-by current is a key factor in designing the portable telephone.

It is, therefore, preferable to reduce current consumption as much as possible to meet the performance requirements of the wireless communication equipment in designing the receiver section of the portable telephone. Channel selectivity is regulated in accordance with the transmission output level. That is, the higher the transmission output level, the more strict are the requirements for the channel selectivity. If the portable telephone is to be used with a booster or the like in a similar manner to the car-mounted telephone (mobile or cellular telephone), a higher performance in channel selectivity is required, similar to the cellular telephone. For this end, it is effective as understood from the above description that a higher voltage and a larger current should be supplied to the voltage controlled oscillator 14 in the receiver section 10.

Unfortunately, in the conventional portable telephone as described hereinbefore, each element in the receiver section is designed to be operated on the power supply voltage V1, essentially similar to the output voltage V0 from the built-in batteries when operated from the external power source. The power supply voltage to be supplied to the voltage controlled oscillator 14 of the portable telephone is essentially the same as that operated on either the built-in batteries or the external power source, thereby making it impossible to optimize the performance of the receiver section 10 by varying the operational conditions of the voltage controlled oscillator 14, depending on the available power sources.

SUMMARY OF THE INVENTION

It is, therefore, an object of the present invention to provide a portable telephone capable of optimizing the performance of the receiver section depending on the available power source, i.e., the built-in batteries or the external power source.

According to the present invention there is provided a portable telephone comprising a first external power input terminal through which an external power of a first voltage substantially equal to the output voltage of said built-in battery is supplied, a second external power input terminal through which an external power of a predetermined second voltage higher than the first voltage is supplied, and a power selector for selectively supplying to the voltage controlled oscillator the power from the built-in battery when powered by the built-in batteries or the power from the second power input terminal when powered from the external power. The power selector may comprise two 2-terminal circuits to pass DC power in one direction. The output terminals of the 2-terminal circuits are commonly coupled to the power input terminal of the voltage controlled oscillator; the input terminals of the 2-terminal circuits are used to supply the input power from the built-in batteries and the second external power source, respectively. The 2-terminal circuits may comprise diodes. Each of the 2-terminal circuits may also comprise a transistor having its base connected to ground through a capacitor, with the collector coupled to the base through a resistor.

Other objects and features will be clarified from the following description with reference to the drawings.

DESCRIPTION OF PREFERRED EMBODIMENTS

Figure 1:
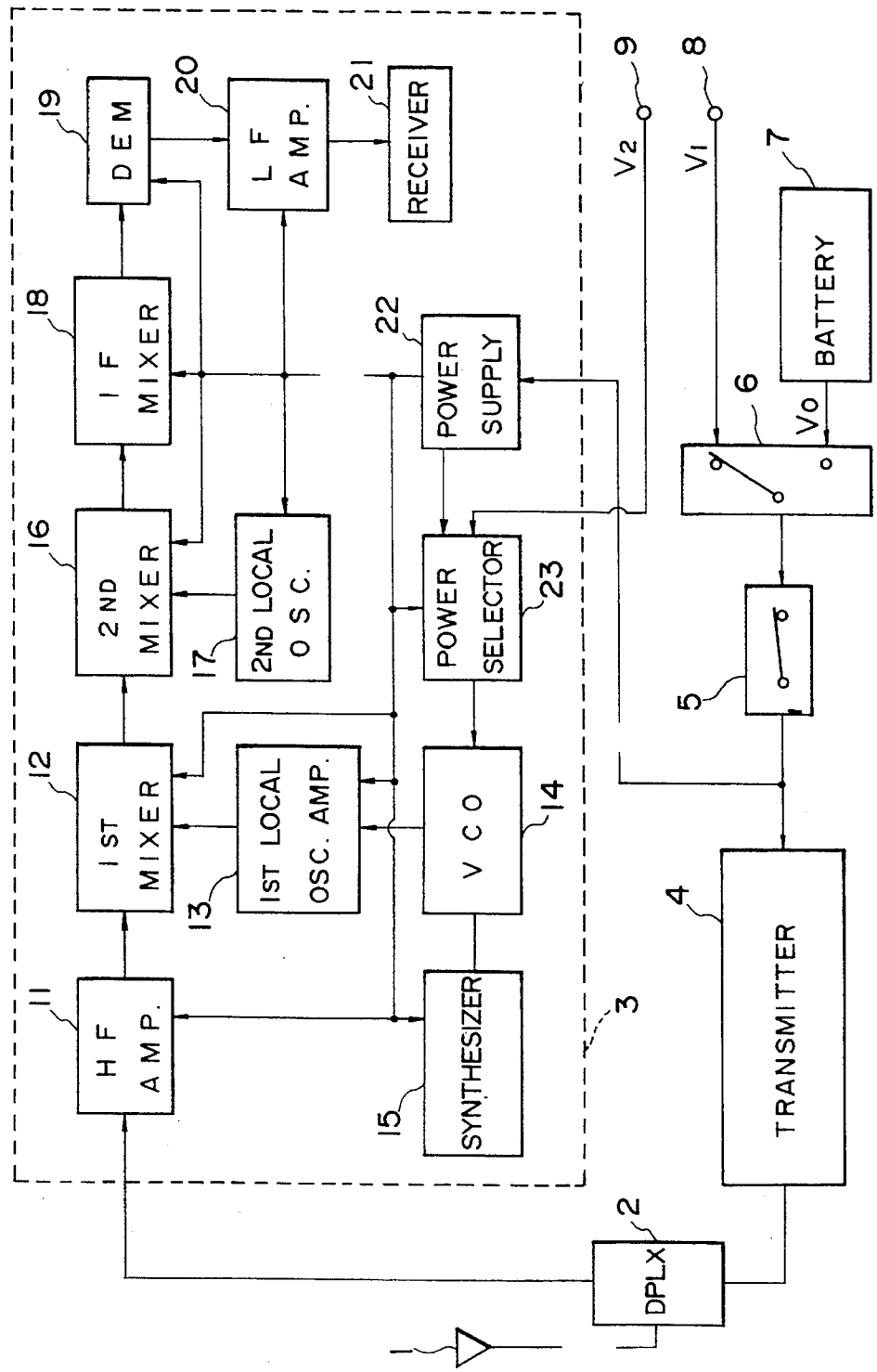
FIG. 1 is a block diagram of one preferred embodiment of the present invention.

Illustrated in FIG. 1 is a block diagram of one embodiment of the present invention comprising an antenna 1, a duplexer 2, a receiver section 3, a transmitter section 4, a power switch 5, a power selector 6, a battery section 7 and external power input terminals 8, 9.

The antenna 1 transmits and receives radio waves. The duplexer 2 in a two-way communication performs separation or the like of the transmission signal from the transmitter section 4 and the received signal for the receiver section 3. The transmitter section 4 transmits an audio and/or data signal as the transmission signal. The receiver section 3 is a superheterodyne type receiver to receive the radio wave for conversion into an audio and/or data signal. The receiver section 3 comprises a high frequency amplifier 11, a first frequency mixer 12, a first local oscillation amplifier 13, a voltage controlled oscillator 14, a synthesizer 15, a second frequency mixer 16, a second local oscillator 17, an intermediate frequency amplifier 18, a demodulator 19, a low frequency amplifier 20, a receiver 21, a regulated power supply 22 and a power selector 23.

The high frequency amplifier 11 in the receiver section 3 selectively amplifies the high frequency input signal received by the antenna 1 by way of the duplexer 2. The first frequency mixer 12 converts the high frequency signal, amplified by the high frequency amplifier 11 using the first local oscillation power from the first local oscillation amplifier 13 to convert it into an intermediate signal of lower frequency. The power selector 23 outputs the voltage corresponding to a voltage V2 to the voltage controlled oscillator 14 when the voltage V2 is higher than the voltage V1. The voltage V2 is supplied to the external power input terminal 9. On the other hand, a voltage equal to the output voltage from the regulated power supply 22 is supplied to the voltage controlled oscillator 14 when the voltage V2 is not supplied to the external power input terminal 9. The output from the voltage controlled oscillator 14 is sent to the first local oscillation amplifier 13. The oscillation frequency of the voltage controlled oscillator 14 is under control of the synthesizer 15.

The second frequency mixer 16 converts the signal from the first frequency mixer 12 into a further lower frequency signal. The second local oscillator 17 is sent to the second frequency mixer 16 as the second local oscillation power. The intermediate frequency amplifier 18 amplifies the intermediate frequency signal, which is frequency converted by the second frequency mixer 16, before supplying it to the demodulator 19. The demodulator 19 demodulates the output signal received from the intermediate frequency amplifier 18 to obtain a low frequency signal. The low frequency amplifier 20 amplifies the low frequency signal from the demodulator before outputting the signal to the receiver 21, which converts the low frequency signal into a voice signal.

The regulated power supply 22 receives the power from either the built-in batteries or the external power source and supplies the operation power of a regulated constant voltage to all elements in the receiver section 3. The power switch 5 is coupled to the regulated power supply 22 in the receiver section 3 and the transmitter section 4. Turning on the power switch 5 will supply the power to the transmitter section 4 and the regulated power supply 22. The power selector 6 is coupled to the battery section 7 and the external power input terminal 8 for selectively sending out to the power switch 5 either the power from the built-in batteries in the battery section 7 or from the external power source supplied to the external power input terminal 8.

The power selector 6 comprises, for example, a mechanical switch. By plugging jacks of AC adapters or the like to the external power input terminals 8 and 9, the output power is switched from the built-in batteries in the battery section 7 to the external power supplies from the external power input terminals 8 and 9. The battery section 7 comprises, for example, rechargeable batteries to supply power to the power selector 6. The output voltage V0 from the battery section 7 is set substantially equal to the voltage V1 of the external power source through the external power input terminal 8. The external power input terminals 8 and 9 are used to couple external power sources when operating the portable telephone on the external power source. The voltage V2 from the external power input terminal 9 is chosen to be higher than the voltage V1 from the external power input terminal 8, i.e., V2>V1.

Figure 2:
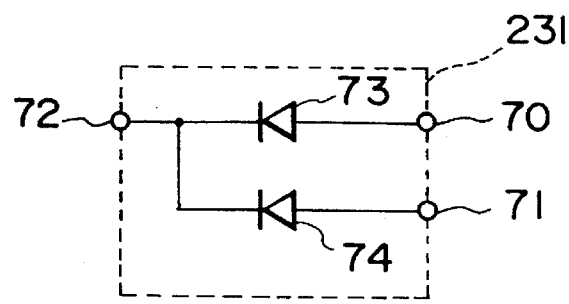
FIG. 2 is a circuit schematic of one embodiment of the power selector 23 in FIG. 1.
Figure 3:
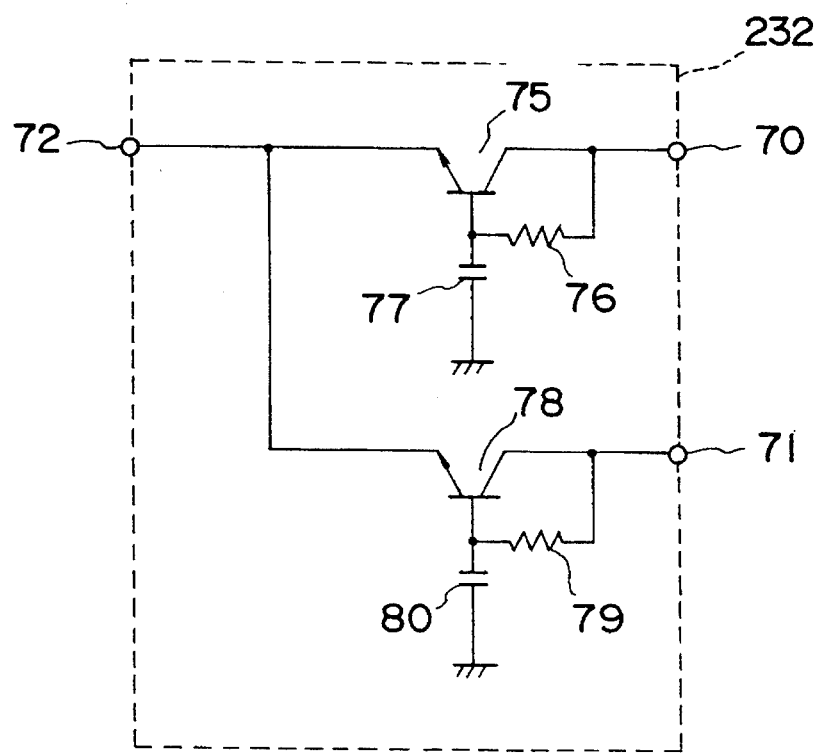
FIG. 3 is a circuit schematic of another embodiment of the power selector 23 in FIG. 1.
Figure 4:
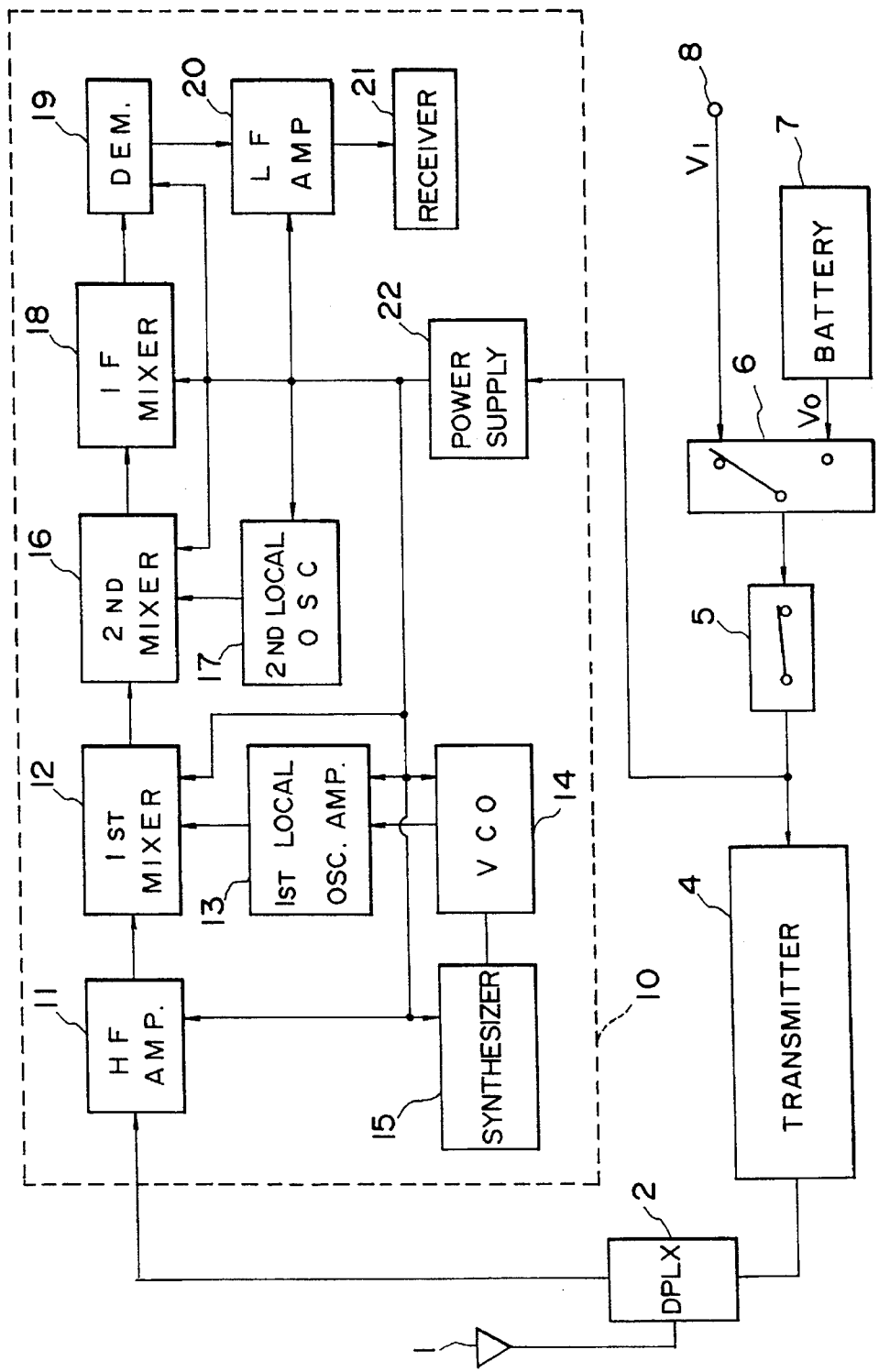
FIG. 4 is a block diagram of an example of conventional portable telephone sets.

Illustrated in FIGS. 2 and 3 are circuit diagrams of two different embodiments of the power selector 23. Terminals 70, 71 and 72 in FIGS. 2 and 3 are connected respectively to the regulated power supply 22 in FIG. 1, the external power input terminal 9 and the power supply output terminal which is, in turn, connected to the power input terminal for the voltage controlled oscillator 14.

The circuit in FIG. 2 utilizes unidirectional characteristic of two diodes 73 and 74. On the other hand, the circuit arrangement in FIG. 3 employs two ripple filters comprising two transistors 75, 78, two resistors 76, 79 and two capacitors 77, 80. However, it is similar to the circuit arrangement in FIG. 2 in that the diode characteristic between the base emitter junctions of the two transistors 75, 78 is utilized. It is to be understood, however, that the circuit in FIG. 3 having ripple reduction capability is preferable, because the power supply for the voltage controlled oscillator requires generally lower voltage fluctuation. Both circuit arrangements in FIGS. 2 and 3 operate essentially the same in that the power source from the terminal 70 or 71 having higher voltage passes through the output terminal 72 by way of the corresponding diode.

Now, the operation of the preferred embodiment will be described hereunder.

When no external power sources are coupled to the external power input terminals 8 and 9, the battery mode is chosen by the power selector 6. When the power switch 5 is turned on, operation power is supplied to the transmitter section 4 and the receiver section 3 from the built-in batteries. The receiver section 3 receives its operation power from the regulated power supply 22, powered by the battery section 7, for supplying power of a constant voltage to all elements in the receiver section 3. Under this condition, supplied to the voltage controlled oscillator 14 in the receiver section 3 is the power from the regulated power supply 22 by way of the power selector 23.

When operating on the external power source, external power sources are coupled to both external power input terminals 8 and 9. The power selector 6 selects the external power mode by coupling the external power sources to the external power input terminals 8 and 9. The voltage V1 from the external power input terminal 8 is supplied through the power selector 6 and the power switch 5 to the regulated power supply 22, from which operation power of a regulated constant voltage is supplied to each element in the receiver section 3. Also, operation power is supplied to the voltage controlled oscillator 14 in the receiver section 3 from the external power input terminal 9 and the power selector 23. It is to be recognized here that the voltage V0 from the battery section 7 is essentially the same as the voltage V1 from the external power input terminal 8 and that the voltage V2 from the external power terminal 9 is higher than the voltage V1. As a result, the power selector 23 selects the voltage V2 from the external power input terminal 9 to be supplied to the voltage controlled oscillator 14.

As described hereinbefore, the preferred embodiment supplies power of different voltages in the external power mode or the battery mode to the voltage controlled oscillator 14 in the receiver section 3. By setting the voltage in the external power mode higher than that in the battery mode, a higher voltage is supplied to the voltage controlled oscillator 14 in the receiver section 3 in the external power mode where a booster may be connected. In this way, S/N ratio in the first local oscillation power can be improved. On the other hand, power consumption can be minimized in the battery mode to an extent satisfying the requirements for the voltage controlled oscillator 14.

Although the receiver section 3 in the illustrated embodiment is constructed as a double superheterodyne receiver, the present invention may be modified to provide the same result to a portable telephone containing a single superheterodyne receiver section, excluding the second frequency mixer 16 and the second local oscillator 17.

As described above, the present invention supplies power of different voltages to the voltage controlled oscillator in the receiver section in accordance with the external power mode and the battery mode with higher supply voltage being provided in the external power mode than in the battery mode. Such an arrangement is effective to realize a portable telephone having a receiver section to comply with higher channel selectivity, by applying a higher voltage to the voltage controlled oscillator. In this way a local oscillator is powered in a receiver section in the external power mode, where the portable telephone may be used with a booster. On the other hand, a reduced voltage and current is supplied to the voltage controlled oscillator in the battery mode to realize lower power consumption, thereby extending the stand-by time.

What is claimed is:

1. A portable telephone containing a synthesized local oscillator using a voltage controlled oscillator in a receiver section, said voltage controlled oscillator receiving its operation power from either a built-in battery or an external power source comprising:

a first external power input terminal through which either an output voltage of said built-in battery or an external power of a first voltage substantially equal to the output voltage of said built-in battery is supplied;

a second external power input terminal through which an external power of a predetermined second voltage higher than said first voltage may be supplied; and a power selector for selectively supplying to said voltage controlled oscillator either the output from said first external power input terminal in the absence of said predetermined second voltage applied to said second external power input terminal, or alternatively the output from said second external power input terminal in the presence of said predetermined second voltage applied thereto.

2. A portable telephone as set forth in claim 1 wherein said power selector comprises two 2-terminal circuits to pass DC power in one direction, the output of terminals of the 2-terminal circuits are commonly coupled to the power input terminal of said voltage controlled oscillator, and the input terminals of said 2-terminal circuits are used to supply the input power from one of said built-in battery and said first external power input terminal, and said second external power source, respectively.

3. A portable telephone as set forth in claim 2 wherein said 2-terminal circuits comprise diodes.

4. A portable telephone as set forth in claim 2 wherein each of said 2-terminal circuits comprises a transistor having the base thereof connected to ground through a capacitor and the collector thereof coupled to the base through a resistor.

5. A portable telephone containing a synthesized local oscillator that uses a voltage controlled oscillator in a receiver section, comprising:

a first power selector for selectively supplying power from either a built-in battery through a built-in battery input terminal, or from a first external power source through a first external power source input terminal;

a second power selector for receiving power from said first power selector through a first power selector input terminal, and also capable of receiving power from a second external power source through a second external power source input terminal, wherein, when no power is received at said second external power source input terminal, said second power selector supplies power from the output of said first power selector input terminal to said voltage controlled oscillator, wherein, when a power is received at said second external power source input terminal, said second power selector supplies power from the output of said second external power source input terminal to said voltage controlled oscillator.

6. A portable telephone as set forth in claim 5, wherein the power supplied at said second external power source input terminal is higher in voltage that the power supplied at said first power selector input terminal.

7. A portable telephone as set forth in claim 5, wherein said second power selector comprises a pair of diodes.

8. A portable telephone as set forth in claim 5, wherein said second power selector comprises a first and a second transistor, each of said transistors having the base thereof connected to a ground voltage through a capacitor, and each of said transistors having the collector thereof coupled to the base thereof through a resistor.

9. A portable telephone as set forth in claim 8, wherein said first transistor has the collector thereof coupled to said first power selector input terminal, and the emitter thereof coupled to said voltage controlled oscillator, and said second transistor has the collector thereof coupled to said second external power source input terminal, and the emitter thereof connected to said voltage controlled oscillator.

10. A method for supplying power to a voltage controlled oscillator (VCO) in a receiver portion of a portable communication device, comprising:

a) selectively supplying power from either a built-in battery through a built-in battery input terminal, or from a first external power source through a first external power source input terminal;

b) receiving said selectively supplied power at a first power selector input terminal, c) when no power is received at a second external power source input terminal, supplying power from the output of said first power selector input terminal to said VCO, d) when power is received at said second external power source input terminal, supplying power from the output of said second external power source input terminal to said VCO.

11. A method as set forth in claim 10, further comprising the steps of:

receiving a radio frequency (RF) signal;

mixing the frequencies of the received RF signal and the output of said VCO to produce an intermediate frequency (IF) signal;

demodulating said IF signal to produce an audio frequency (AF) signal; and transducing said AF signal to an audible signal.

\* \* \* \* \*